United States Patent [19]

Saita

[11] Patent Number: 5,188,518

[45] Date of Patent: Feb. 23, 1993

[54] PUMPING DEVICE DRIVEN BY A FLUID DRIVEN RECIPROCATING ACTUATOR

[75] Inventor: Seiji Saita, Hachioji, Japan

[73] Assignee: Kabushiki Kaisha Yamada Corp., Tokyo, Japan

[21] Appl. No.: 794,961

[22] Filed: Nov. 20, 1991

[30] Foreign Application Priority Data

Nov. 30, 1990 [JP] Japan .................................. 341030

[51] Int. Cl.$^5$ .............................................. F04B 9/12
[52] U.S. Cl. .................................... 417/403; 91/224; 91/228
[58] Field of Search ...................... 417/401, 402, 403; 91/224, 228, 229

[56] References Cited

U.S. PATENT DOCUMENTS

| 2,235,544 | 3/1941 | Wold | 417/403 |
| 2,298,920 | 10/1942 | Barks et al. | 417/403 X |
| 2,932,285 | 4/1968 | Peers | 91/229 X |

FOREIGN PATENT DOCUMENTS 847680 9/1960 United Kingdom ................. 417/401

*Primary Examiner*—Leonard E. Smith
*Attorney, Agent, or Firm*—Morrison Law Firm

[57] ABSTRACT

A reciprocating actuator is axially connected to drive a reciprocating pump. An exhaust tube, open to the outside, passes through a piston of the reciprocating actuator and into an inner hole axially disposed in a working rod that connects an actuator piston of the reciprocating actuator to the reciprocating pump. A valve mechanism communicates a chamber above the actuator piston with the inner hole during upward motion of the piston, whereby actuator fluid above the piston is exhausted to the outside through the exhaust tube. The resulting axial exhausting of the actuating fluid permits inserting a large portion of the device into a drum for pumping of liquid. The invention permits use of a two-stage rod system, which is capable of obtaining high pumping pressure. The inner hole is communicated with a space whose volume changes when the working rod makes a vertical movement. Different piston sizes can be used in the reciprocating actuator and the reciprocating pump, whereby higher or lower pump pressure is attainable.

6 Claims, 1 Drawing Sheet

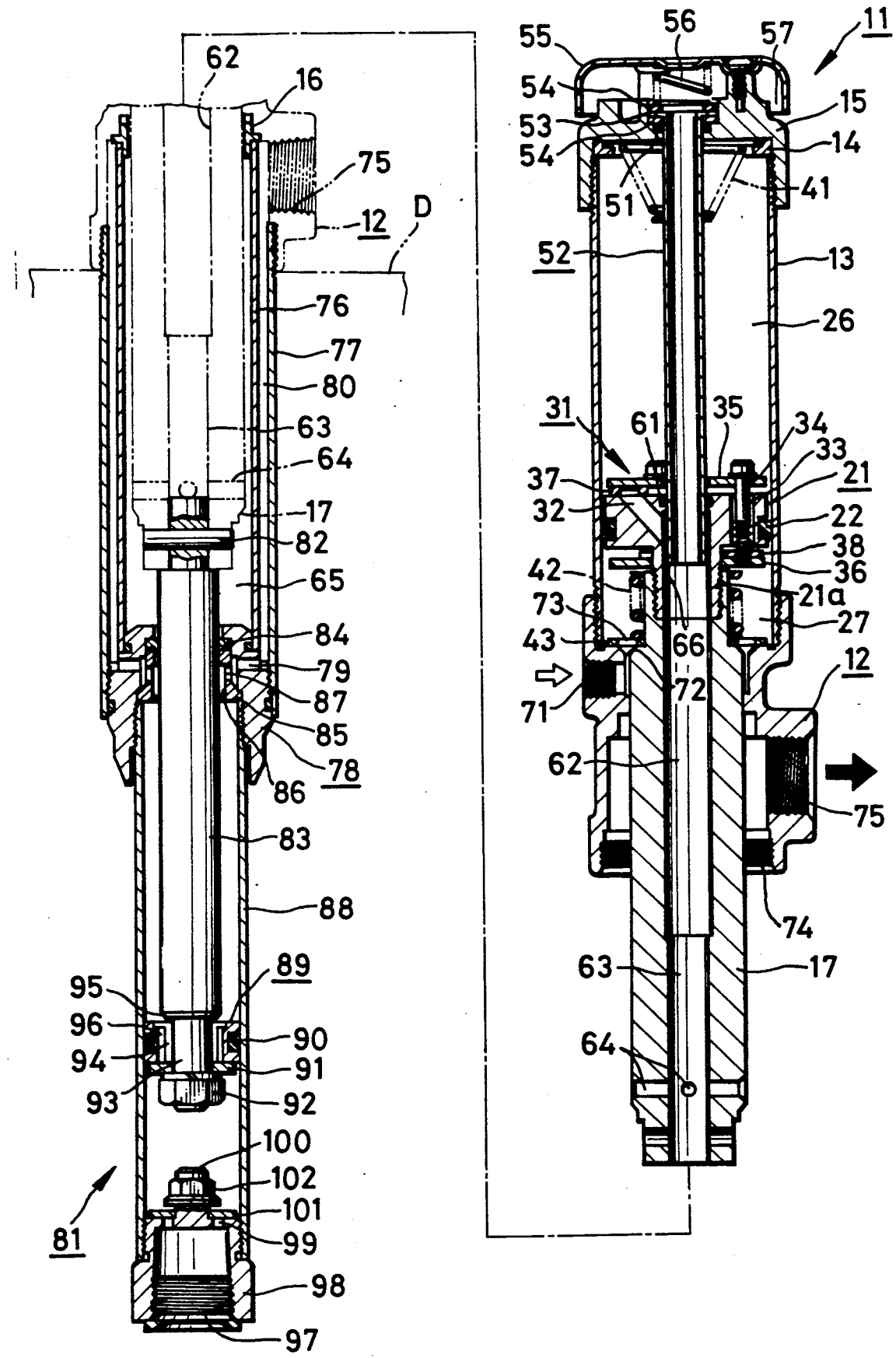

PUMPING DEVICE DRIVEN BY A FLUID DRIVEN RECIPROCATING ACTUATOR

BACKGROUND OF THE INVENTION

1. Field of the Invention

The present invention relates to a pumping device particularly suited for insertion into a drum or other similar container.

2. Description of the Prior Art

As shown in the specification and the drawings of U.S. Pat. No. 3,094,938, a pumping device is disclosed having a reciprocating pump below a reciprocating actuator driven by pressurized working fluid.

The diameters of a working piston of the reciprocating actuator and a working piston of the reciprocating pump of the above pumping device are identical.

With the above type of pumping device, one way to increase pump output pressure is to make the diameter of the working piston of the reciprocating pump smaller than that of the working piston of the reciprocating actuator.

In that case, it may be convenient to use a pump piston which vertically moves in the pump cylinder below the working rod of the reciprocating actuator with a pump rod having a smaller diameter than the working rod in between, since then there is no need to modify the structure of the reciprocating actuator.

This construction has a problem in finding a way to vent the enclosed space, in which the working rod of the reciprocating actuator moves up and down, to the outside.

Especially in the case where the reciprocating pump is inserted into a drum so that only a small portion of the pumping device protrudes from the can, the space in which the working rod moves vertically (hereinafter called the working rod vertical movement space) is also inside the drum. Therefore, simply boring a hole in the cylinder is not effective to vent the enclosed space surrounding the movement space surrounding the working rod vertical to the outside.

Since the above problem has not yet been solved, a conventional pump calls for the entire body of the reciprocating actuator and the reciprocating pump to project outside the drum, as shown in the specification and the drawings of said U.S. Pat. No. 3,094,938. In addition, this problem makes it impossible to employ a two-stage rod system to increase the pump output pressure.

OBJECTS AND SUMMARY OF THE INVENTION

It is an object of the invention provide a pumping device which solves the problem of opening to the outside the enclosed space in which the working rod of the reciprocating actuator moves up and down. This permits placing the entire reciprocating pump inside a drum and employing a two-stage rod system, thereby making it possible to increase the pump output pressure.

Briefly stated, the present invention provides a reciprocating actuator that is axially connected to drive a reciprocating pump. An exhaust tube, open to the outside, passes through a piston of the reciprocating actuator and into an inner hole axially disposed in a working rod that connects an actuator piston of the reciprocating actuator to the reciprocating pump. A valve mechanism communicates a chamber above the actuator piston with the inner hole during upward motion of the piston, whereby actuator fluid above the piston is exhausted to the outside through the exhaust tube. The resulting axial exhausting of the actuating fluid permits inserting a large portion of the device into a drum for pumping of liquid. The invention permits use of a two-stage rod system, which is capable of obtaining high pumping pressure. The inner hole is communicated with a space whose volume changes when the working rod makes a vertical movement. Different piston sizes can be used in the reciprocating actuator and the reciprocating pump, whereby higher or lower pump pressure is attainable.

According to an embodiment of the invention, there is provided a pumping device comprising: a reciprocating actuator driveable by a pressurized working fluid, a reciprocating pump, means for connecting said reciprocating actuator and said reciprocating pump for concerted movement, said means for connecting including a working rod connecting a working piston of said reciprocating actuator to a pump rod of said reciprocating pump, an exhaust tube in said reciprocating actuator, said exhaust tube being concentrically disposed within said working rod and extending along substantially an entire length of a working cylinder, said exhaust tube fitting through a center of a working piston of said reciprocating pump and into an inner hole in said working rod, a pump piston in said reciprocating pump connected to said pump rod, said pump piston having a diameter that is different from a diameter of said working piston, a pumped substance output port, a pumped substance elevating passage communicating between said reciprocating pump and a pumped substance output port, and means for permitting pumped substance from said reciprocating pump to pass into said pumped substance elevating passage, whereby pumped substance is discharged from said pumping device.

According to a feature of the invention, there is provided a pumping device comprising: a reciprocating actuator, a reciprocating pump concentrically disposed with respect to said reciprocating actuator, an actuator piston dividing a working cylinder into an upper working fluid chamber and a lower working fluid chamber, an exhaust tube axially disposed in said reciprocating actuator said exhaust tube being open at its upper end, a lower end of said exhaust tube being sealingly fitted in said actuator piston, whereby said actuator piston is enabled to move in reciprocal motion, a working rod connecting to said actuator piston to said reciprocating pump, an inner hole axially disposed in said working rod, said exhaust tube extending at least partly into said inner hole, and means for valving a working fluid from said upper working fluid chamber to said inner hole during upward travel of said actuator piston, whereby working fluid from said upper working fluid chamber passes through said exhaust tube during said upward travel.

According to a further feature of the invention, there is provided a pumping device comprising: a reciprocating actuator, a reciprocating pump coaxially connected to said reciprocating actuator, means for admitting an actuating fluid to said reciprocating actuator, means for exhausting said actuating fluid from said reciprocating actuator, and said means for exhausting being disposed at an upper end of said reciprocating actuator, whereby a substantial portion of said pumping device may be inserted into a container.

The above, and other objects, features and advantages of the present invention will become apparent from the following description read in conjunction with the accompanying drawing.

BRIEF DESCRIPTION OF THE DRAWING

The drawing is a longitudinal cross section showing an embodiment of a pumping device according to the present invention.

DETAILED DESCRIPTION OF THE PREFERRED EMBODIMENT

Referring to the drawing, a reciprocating pump, driven by pressurized working fluid such as, for example, air, includes a reciprocating actuator 11 with a working cylinder 13 screwed airtight in an upper portion of a body 12. A head cover 15 is screwed airtight on an upper end of working cylinder 13. A packing 14 seals the junction of head cover and the upper end of working cylinder 13.

A working rod 17 passes through body 12, with packing 16 sealing against leakage therebetween. Working rod 17 is vertically movable in body 12. A lower cylinder portion 21a of a working piston 21 is screwed into an upper portion of working rod 17 to form an integral part thereof.

Working piston 21, of a single-rod type, is positioned inside working cylinder 13, with a slidable packing 22 fitted around working piston 21 dividing the inside space of working cylinder 13, to form an upper working fluid chamber 26 and a lower working fluid chamber 27.

Working piston 21 includes a directional control valve mechanism 31 to switch, at an end of reciprocating movement, supply and discharge of working fluid to and from working fluid chambers 26 and 27 at both sides of working piston 21.

Directional control valve mechanism 31 includes a working fluid exhaust hole 32 and a working fluid ventilation hole bored through working piston 21. serving as the working fluid exhaust hole and ventilation hole 33 are bored through working piston 21. An upper valve plate 35 and a lower valve plate 36 are held in place on opposite sides of working piston 21 by a connector 34 movably inserted in ventilation hole 33. Upper valve plate 35 has a seat 37 for closing exhaust hole 32. Lower valve plate 36 has a seat 38 for closing ventilation hole 33.

A spring 41 is retained in the upper end of working cylinder 13 by packing 14. Upper valve plate 35 is actuated by the pushing force of spring 41 during an end portion of an upward stroke of working piston 21. A spring 42 and a washer 43 are fitted around the upper end of working rod 17. Lower valve plate 36 is actuated by the pushing force of spring 42 during an end portion of a downward stroke of working piston 21.

An exhaust pipe 52 passes through head cover 15, into working cylinder 13 and extending almost to the lower end of working cylinder 13. An O ring 51 seals between exhaust pipe 52 and head cover 15. A flange 53 at an upper end of exhaust pipe 52 is sandwiched by a pair of washers 54 and held in place by force exerted by a spring 56 between flange 53 and a cap 55 screwed onto head cover 15. A mouth of cap 55 is open at the bottom to serve as an exhaust port 57.

Exhaust pipe 52 passes axially through working piston 21, with a packing 61 sealing against leakage therepast. A lower end of exhaust pipe 52 extends into an inner hole 62 bored along the center axis of working rod 17. Inner hole 62 is connected to a working rod vertical movement space, as will be explained herein after, through a passage hole 63 in the axial direction and a plurality of passage holes 64 in the radial direction of working rod 17. Exhaust hole 32 of directional control valve mechanism 31 is also connected to exhaust pipe 52 through a gap 66 between the perimeter of exhaust pipe 52 and an inner surface of working piston 21.

Body 12 includes an air intake port 71 connected to lower working fluid chamber 27 through a gap 72 between body 12 and working rod 17, and a plurality of holes 73 bored in washer 43. Body 12 is also includes a lower tapped hole 74 and a pumped substance output port 75.

In use, the portion of reciprocating actuator 11 above body 12 projects from the top of a drum D. An upper end opening of a pump connecting tube 76 having the smaller diameter (hereinafter called small diameter tube 76) is tightly screwed into lower tapped hole 74 of body 12 to prevent leakage or a liquid pumped substance.

A pump connecting tube 77 having larger diameter (hereinafter called large diameter tube 77) concentrically positioned around small diameter tube 76. An upper end large diameter tube 77 is fitted liquid-tight in tapped hole 74 of body 12. An upper portion of an adapter 78 is fitted liquid-tight to a lower end opening of small diameter tube 76. A large diameter portion of adapter 78 is fitted liquid-tight in an end opening of large diameter tube 77. A space between the upper end openings of small diameter tube 76 and large diameter tube 77 is left open so that a cylindrical substance elevation passage 80 between these tubes is connected to the aforementioned pumped substance output port 75. Similarly, a space between the lower end openings of small diameter tube 76 and large diameter tube is left open to communicate cylindrical substance elevation passage 80 to a pumped substance passage hole 79 bored in adapter 78.

A reciprocating pump 81 has a pump rod 83 connected by a pin 82 to the lower end of working rod 17. The diameter of pump rod 83 is smaller than the diameter of working rod 17. Pump rod 83 is slidably fitted through a packing 84 and a bush 85 in adapter 78. Gap 86 between bush 85 and pumped rod 83 is wide enough to allow a pumped substance to move therethrough into a substance passage hole 87 bored in bush 85 and pumped substance passage hole 79 in adapter 78 to connect pumped substance from a region surrounding pump rod to pumped substance elevation passage 80.

A pump cylinder 88 having the diameter smaller than working cylinder 13, is screwed liquid-tight into the lower part of adapter 78. A pump piston 89, which has a smaller diameter than working cylinder 13, moves up and down inside pump cylinder 88 is provided at the bottom of pump rod 83. The space above pump piston 89 is always connected, through gap 86 inside bush 85, substance passage holes 87 and 79 and cylindrical pumped substance elevation passage 80, to pumped substance output port 75 at the lower part of reciprocating actuator 11.

Pump piston 89 is attached by a nut 92 on small diameter portion 93 at a lower end of pump rod 83. A packing 90 fitted about the perimeter of pump piston 89 prevents leakage therepast while permitting axial reciprocating motion of pump piston 89 and pump rod 83. A gap, wide enough to allow pumped substance to move therethrough, is disposed around an outside of plate valve 91 and around an inner side of pump piston 89. A gap 94 around an inner side of pump piston 89 has a groove portion 96 formed in an axial direction to catch a step 95 of pump rod 83. Gap 94 remains open upward because of groove portion 96, even when step 95 of pump rod 83 pushes pump piston 89 downward during the downward movement of pump rod 83.

An adapter 98, having a substance intake port 97 therein, is screwed into a lower part of pump cylinder 88. Adapter 98 includes a substance intake hole 99. A plate valve 101 around a screw shank portion 100, protruding above substance intake hole 99, is movable in the axial direction. A nut 102 on screw shank portion 100 secures plate valve 101 in place. A gap between the outer edge of plate valve 101 and the inner surface of pump cylinder 88 is wide enough to allow pumped substance to move therepast.

A working rod vertical movent space 65 inside tube 76 is always vented in the radial direction through passage hole 64 direction, passage hole 63 in the axial direction and inner hole 62, all three of which are bored in working rod 17, and exhaust pipe 52.

When the upper end of exhaust hole 32 of reciprocating actuator 11 is closed by seat 37 of valve plate 35, the upper and the lower ends of ventilation hole 33 are opened, thereby supplying pressurized air from air intake port 71 to the lower working chamber 27 through gap 72, etc. In addition, pressurized air is fed to upper working fluid chamber 26 through ventilation hole 33, whereby virtually the same atmospheric pressure is applied to the upper and lower surfaces of piston 21. However, the upper and lower areas of working piston 21 to which the pressure is respectively applied are different. That is, the areas of the upper side (the side opposite to the rod) and the lower side (the rod side), are not identical. As a consequence, since the lower pressure receiving area of working piston 21 is smaller than the upper pressure receiving area by the cross section of working rod 17, working piston 21 is pushed downward.

When the lower spring 42 contacts lower valve plate 36, and is compressed sufficiently so that its spring force reaches a predetermined value at the end of the downward stroke of working piston 21, upper valve plate 35 and lower valve plate 36 move upward relative to the downward movement of working piston 21. Upper valve plate 35 is moved out of sealing contact with seat 37 at the upper end of exhaust hole 32. At the same time the lower end of ventilation hole 33 is sealed by seat 38. As a result, pressurized air from air intake port 71 entering lower working fluid chamber 27 works only upon the lower surface of working piston 21, thereby reversing the motion of working piston 21 and driving it upward. During the upward movement, air in upper working fluid chamber 26 is exhausted to the outside through exhaust hole 32, which has been opened as explained above, gap 66, exhaust pipe 52 and exhaust port 57 in cap 55.

At the end of the upward stroke of working piston 21, valve plate 35 contacts upper spring 41. Resilient reaction of spring 41 pushes upper valve 35 and lower valve plate 36 downward relative to the upward motion of working piston 21. Exhaust hole 32 is closed by seat 37. Seat 38 is unseated from ventilation hole 33. Consequently, in the process described above, the direction of motion of working piston 21 is reversed from the upward direction to the downward direction.

Thus, pump rod 83 of reciprocating pump 81 repeats its alternate upward and downward vertical movement by the automatic switching at the ends of upward and downward strokes of reciprocating actuator 11.

When pump rod 83 moves upward, gap 94 around the inside of pump piston 89 and groove portion 96 is tightly closed by plate valve 91 on nut 92. Therefore, substance contained in the portion of the cylinder above pump piston 89 is conveyed by pressure to pumped substance output port 75 through substance passage hole 87 of bush 85, pumped substance passage hole 79 of adapter 78 and cylindrical pumped substance elevation passage 80. During the upward movement of pump rod 83, substance in drum D is sucked through substance intake port 99 into the space under pump piston 89 through the gap around the outer side of floating plate valve 101.

As pump piston 89 is pushed down when pump rod 83 moves downward, substance intake port 99 is closed by plate valve 101. Therefore, substance in pump cylinder 88 above plate valve 101 is moved to a position above pump piston 89 through the gap around the outer side of plate valve 91, gap 94 around the inner side of piston 89 and groove portion 96. An amount of substance equal to the volume of the portion of pump rod 83 which has advanced into pump cylinder 88 is conveyed by pressure out of pump cylinder 88 to pumped substance output port 75 through pump substance elevation passage 80, and the remainder of the path discussed above.

Since the present invention employs a two-stage rod system consisting of working rod 17 and small diameter pump rod 83 connected together, it is possible, without changing the diameter of working rod 17, i.e. without altering the structure of reciprocating actuator 11, to change the diameter of the pump piston 89 in reciprocating pump 81 to obtain higher or lower pump output pressure. One skilled in the art will recognize that the output pressure is in inverse proportion to the ratio between the pressure-receiving areas of working piston 21 and pump piston 89.

The following explains the flow of air in working rod vertical movement space 65 during vertical movement of working rod 17 of reciprocating actuator 11.

When working rod 17 moves downward, the volume of space 65 decreases. As a result, air in space 65 passes through passage holes 64 and 63 and inner hole 62 of working rod 17 and exhaust pipe 52 and is exhausted from the upper end of reciprocating actuator 11 to the outside. When working rod 17 moves upward, air is sucked into working rod vertical movent space 65 in the reverse sequence, and smooth operation of reciprocating actuator 11 is thus ensured.

According to the present invention, since the enclosed space in which the working rod of a reciprocating actuator moves vertically is connected to the outside above the reciprocating actuator through passage holes bored in the working rod and a working fluid discharge pipe, it is possible to insert the entire body of a reciprocating pump below the reciprocating actuator into a drum can, thereby reducing the length of the portion of the reciprocating actuator that protrudes from the top of the drum. The above also permits employment of two-stage rod system, thereby changing the ratio of the pressure-receiving areas of the working piston and the pump piston, and thus changing the pump output pressure.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A pumping device comprising:
    a reciprocating actuator driveable by a pressurized working fluid;
    a reciprocating pump;
    means for connecting said reciprocating actuator and said reciprocating pump for concerted movement;
    said means for connecting including a working rod connecting a working piston of said reciprocating actuator to a pump rod of said reciprocating pump;
    an exhaust tube in said reciprocating actuator;
    said exhaust tube being concentrically disposed within said working rod and extending along substantially an entire length of a working cylinder;
    said exhaust tube fitting through a center of a working piston of said reciprocating pump and into an inner hole in said working rod;
    a pump piston in said reciprocating pump connected to said pump rod;
    said pump piston having a diameter that is different from a diameter of said working piston;
    a pumped substance output port;
    a pumped substance elevating passage communicating between said reciprocating pump and a pumped substance output port; and
    means for permitting pumped substance from said reciprocating pump to pass into said pumped substance elevating passage, whereby pumped substance is discharged from said pumping device.

2. Apparatus according to claim 1, wherein said means for permitting includes a small diameter tube concentrically disposed inside a large diameter tube, an annular space between said small diameter tube and said large diameter tube being said pumped substance elevating passage.

3. Apparatus according to claim 2, wherein said means for permitting includes:
    upper ends of said small diameter tube and said large diameter tube being open for fluid communication therebetween;
    a pumped substance output port connected to said upper ends;
    lower ends of said small diameter tube and said large diameter tube being open for fluid communication therebetween; and
    means for permitting pumped fluid from said reciprocating pump to reach said lower ends, whereby pumped substance is permitted to flow from said reciprocating pump to said output port.

4. A pumping device comprising:
    a reciprocating actuator;
    a reciprocating pump concentrically disposed with respect to said reciprocating actuator;
    an actuator piston dividing a working cylinder into an upper working fluid chamber and a lower working fluid chamber;
    an exhaust tube axially disposed in said reciprocating actuator;
    said exhaust tube being open at its upper end;
    a lower end of said exhaust tube being sealingly fitted in said actuator piston, whereby said actuator piston is enabled to move in reciprocal motion;
    a working rod connecting to said actuator piston to said reciprocating pump;
    an inner hole axially disposed in said working rod;
    said exhaust tube extending at least partly into said inner hole; and
    means for valving a working fluid from said upper working fluid chamber to said inner hole during upward travel of said actuator piston, whereby working fluid from said upper working fluid chamber passes through said exhaust tube during said upward travel.

5. Apparatus according to claim 4, wherein said means for valving includes:
    a gap between an outer surface of said exhaust tube and an inner surface of said inner hole;
    said gap being large enough to permit said working fluid to pass therethrough;
    an exhaust hole in said actuating piston communicating said upper working fluid chamber with said gap; and
    a means for opening said exhaust hole during upward travel of said actuating piston, thereby permitting said actuating fluid to flow from said upper actuating fluid chamber to said gap, and thence through said exhaust tube.

6. Apparatus according to claim 4, wherein said actuating fluid is pressurized air.

* * * * *